Dec. 18, 1962    B. E. SCHANER ET AL    3,069,338
FUEL ELEMENT FOR NEUTRONIC REACTORS
Filed May 28, 1958    2 Sheets-Sheet 1

Fig. I.

WITNESSES

INVENTORS
Burton E. Schaner &
Richard A. Wolfe
BY
ATTORNEY

Dec. 18, 1962   B. E. SCHANER ET AL   3,069,338
FUEL ELEMENT FOR NEUTRONIC REACTORS
Filed May 28, 1958   2 Sheets-Sheet 2

United States Patent Office 3,069,338
Patented Dec. 18, 1962

3,069,338
FUEL ELEMENT FOR NEUTRONIC REACTORS
Burton E. Schaner, Bethel, and Richard A. Wolfe, West Mifflin, Pa., assignors, by mesne assignments, to the United States of America as represented by the United States Atomic Energy Commission
Filed May 28, 1958, Ser. No. 738,525
6 Claims. (Cl. 204—154.2)

The present invention relates generally to composite elements, and particularly to barrier materials useful in preventing a metallurgical reaction between mating surfaces of dissimilar materials composing such elements. More particularly, the invention relates to a novel barrier material for preventing a metallurgical interaction between mating surfaces of a member formed from uranium or a uranium base alloy and a member formed from zirconium or a zirconium base alloy and the like.

Fuel elements for neutronic reactors have been fabricated in the past by sandwiching the fuel material between members formed from a suitable clad material and then hot working the sandwiched element whereby it is elongated in size and reduced in thickness. Such hot working creates a bond between the fuel material and the cladding.

In the copending application of Walter J. Hurford, Robert B. Gordon and William A. Johnson, Serial No. 731,801, filed April 29, 1958, entitled "Composite Fuel Element" and assigned to the same assignee as the present invention, there is described a fuel element which need not be fabricated by hot working, but rather is formed to final dimensions. One embodiment of the Hurford et al. fuel element comprises a fuel material consisting of a compact of uranium dioxide powder and a cladding formed from an alloy of zirconium. The copending application of Richard A. Wolfe, a co-inventor of the present invention, Serial No. 738,113, filed May 27, 1958, entitled "Bonding of Metal Members," and assigned to the same assignee as the present invention, describes one method for bonding the mating surfaces of the Hurford et al. fuel element which includes the forming of a layer of a metal such as copper, silver, iron, nickel or alloys thereof on the cladding by chemical displacement. The metallic layer on the cladding is preferably formed by the method described in the copending application of Frank M. Cain, Jr., Serial No. 715,852, filed February 18, 1958, entitled "Method of Coating Zirconium and Zirconium Base Alloys by Electroless Plating" and assigned to the same assignee as the present invention. In forming the Hurford et al. fuel element by the Wolfe method, it is to be noted that intimate contact is required between the mating surfaces of the cladding.

We have determined that fabrication of the Hurford et al. fuel element by the Wolfe process has resulted in a diffusion of the fuel material into the cladding material. This layer of diffused metal has been corrosion tested and has been found unsatisfactory corrosion-wise for operation in a highly corrosive medium, such, for example, as pressurized hot water or steam. This corrodible layer would normally result in causing fuel elements of the type discussed to be unacceptable for use in a neutronic reactor or, if used, would substantially limit the lifetime of such fuel elements. This invention has to do with the provision of a layer of some barrier material to prevent interaction of the fuel and cladding during the joining operation. As will hereinafter be more fully described, we have tested many possible barrier materials and have found only one material which satisfactorily prevents the diffusion of the fuel material into the cladding material and which does not react detrimentally with the cladding.

Accordingly, the primary object of this invention is to provide a barrier material to prevent the diffusion of a fuel material into its cladding.

Another object of this invention is to provide a novel barrier material for preventing the diffusion of uranium or a uranium alloy into a mating surface of a member formed from zirconium or a zirconium alloy.

A more particular object is to prevent the diffusion of a uranium or uranium base material into a zirconium or zirconium base material by coating one of the materials with a barrier material formed from graphite.

These and other objects of this invention will be more easily understood from the following detailed description of one embodiment of this invention with reference to the attached drawings, in which.

Figure 1:
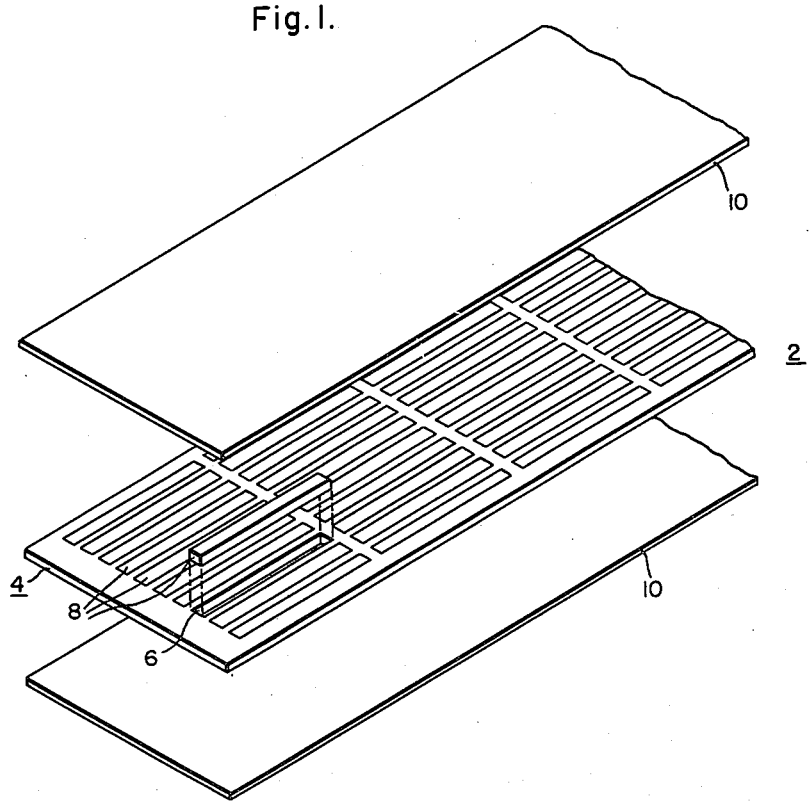
FIGURE 1 is an exploded fragmentary view of a fuel element.

Referring to FIG. 1, a fuel element which utilizes the present invention may comprise a compartmented plate type fuel element 2 which includes a central filler plate 4 having a plurality of spaced compartments 6 therein adapted for the location of fuel wafers 8. The fuel element 2 is further provided with a pair of cover plates 10 which are adapted to be secured to opposite sides of the filler plate 4 to enclose the fuel wafers 8 in the compartments 6 therein. The fuel element 2 may be utilized in any suitable reactor such, for example, as the reactor shown and described in the aforementioned Hurford et al. application.

While any suitable clad or fuel material may be utilized, the present example includes a clad material formed from a zirconium base alloy such, for example, as the alloy described in Thomas et al. Patent No. 2,772,964, entitled "Zirconium Alloy" and assigned to the same assignee as the present invention. The fuel wafers 8 may be formed from uranium dioxide powder which is pressed and sintered.

To fabricate the fuel element 2, the filler plate 4 is nickel plated preferably by the manner described in the aforementioned Cain application. The filler plate 4 is located on one of the cladding plates 10 and a fuel wafer 8 is inserted in each of the compartments 6. The other cladding plate 10 is located on the opposite side of the filler plate 4 and the filler plate 4 is secured to each of the cladding plates 10 by suitable means, such, for example, as by the method described in the aforementioned Wolfe application. The Wolfe method substantially consists of obtaining intimate contact between the mating surfaces on the filler plate 4 and the cladding plates 10, such, for example, as by seam welding or roll spot welding. The fuel plate is then heated in a furnace in either an inert atmosphere or in vacuum at 1000° C. until a eutectic layer of zirconium-nickel is formed at the mating surfaces of the filler plate 4 and cladding plate 10. The fuel element 2 is maintained at this temperature until the eutectic layer is completely diffused away into the base metal.

Figure 2:
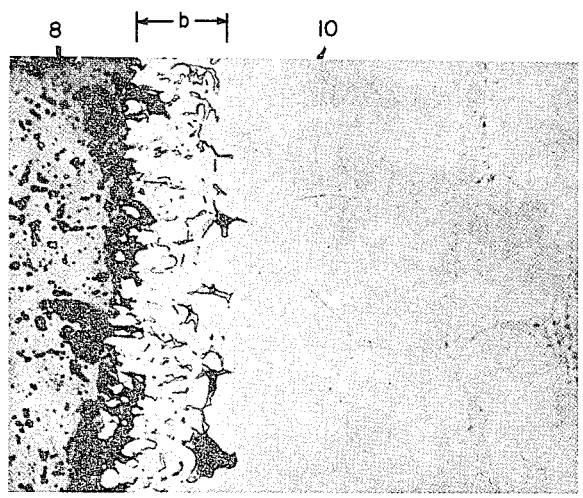
FIG. 2 is a photomicrograph of the normal diffusion of uranium dioxide into a mating surface of a member formed from a zirconium base alloy.

Viewing FIG. 2, it is to be noted that this figure represents a photomicrograph of the fuel element 2 after bonding by the Wolfe method has been completed. There is shown a cross section of the fuel wafer 8 on the left-hand side of FIG. 2 and one of the cladding plates 10 on the right-hand side thereof. It is to be noted that in the region indicated as $b$, a diffusion of the uranium dioxide into the zirconium alloy has taken place. The layer of material formed by such diffusion has been corrosion tested and has been found to be unsatisfactory for reactor applications.

Figure 3:
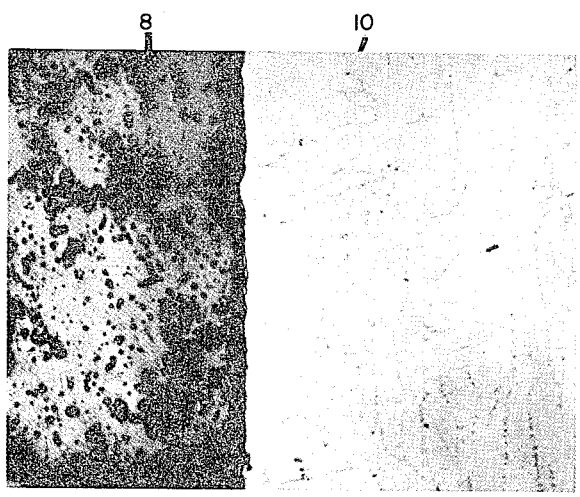
FIG. 3 is a photomicrograph similar to that shown in FIG. 2, in which a coating of graphite has been placed on one of the two mated members.

Viewing FIG. 3, it is to be noted that a similar fuel element treated by the same method does not provide the diffusion layer shown in FIG. 2. This is prevented by the spraying or brushing of a colloidal suspension of graphite in an evaporable liquid such, for example, as alcohol on the fuel wafer 8 and by then heating the fuel wafer 8 to evaporate the alcohol.

Other materials have been tried to prevent the diffusion of the uranium alloy into the zirconium alloy and all have proven to be unsuccessful. Magnesium oxide, zirconium oxide and molybdenum sulphide were found to react with the zirconium alloy to produce a non-corrosion resistant layer of material. Metals such as nickel, iron, copper and silver were found to form liquid eutectics during the bonding process which impaired the bonding by also forming non-corrosion resistant layers of material caused by their reaction with the uranium material. Refractory metals, such as chromium, molybdenum and tantalum were also tried as a barrier material. In these instances also the refractory metals were found to diffuse into a beta zirconium and produce a non-corrosion resistant layer on the inner surface of the cladding plate. Thus it has been found that only graphite can be used successfully to prevent the interdiffusion of the fuel material with the cladding material.

The graphite preferably comprises a colloidal suspension of fine graphite powder in an evaporable liquid, such as alcohol, and may be applied to either the uranium fuel wafer 8 or to the cladding plate 10. The graphite may be applied by brushing the suspension on the surface or by spraying the suspension thereon. Furthermore, it may be preferable to preheat the member to be coated so that the suspending medium evaporates on contact leaving only the graphite deposit on the surface. It has also been determined that as little as two milligrams of graphite per square inch is sufficient to prevent the interdiffusion of the fuel and the cladding.

Example I

Six fuel wafers, three of which being formed from uranium dioxide and the other three from a mixture of 21 w/o uranium dioxide and 79 w/o aluminum oxide were sandwiched between two sheets of a zirconium alloy. One of the uranium dioxide wafers was coated with zirconium oxide, another with graphite, and the third contained no coating. One of the uranium dioxide-aluminum oxide wafers was coated with graphite, another with zirconium oxide and a third was left with no coating. The sandwiched assembly was placed between graphite plates, wired together with nichrome wire and heated in a furnace for one hour at 1000° C. The assembly was furnace cooled and the zirconium plates were corrosion tested for three days, at 750° F. steam at 2000 p.s.i.

The portions of the zirconium plates in contact with the uranium dioxide and uranium dioxide-aluminum oxide wafers having a zirconium oxide coating were found to have zirconium oxide stuck to the plate at high points of the samples.

The portion of the zirconium alloy plate in contact with the uranium dioxide wafer having no coating had deposits of uranium dioxide thereon and the portion of the plate in contact with the uncoated uranium dioxide-aluminum oxide wafer had an adherent white deposit thereon.

The portions of the zirconium alloy plate in contact with the uranium dioxide and uranium dioxide-aluminum oxide wafers having the graphite coating thereon had no deposit or sticking of the fuel material on the surface.

The above test indicated that not only is the graphite effective in preventing the reaction of the fuel material with the cladding plate but also prevented the sticking of the fuel material to the cladding plate.

Example II

Four 21 w/o uranium dioxide-79 w/o aluminum oxide fuel wafers were located in the compartments of a nickel plated filler plate. One of the samples was given three coatings of graphite suspended in alcohol on both sides. The second sample was given two coatings of graphite suspended in alcohol, the third had one coating on both sides and the fourth was left uncoated. The wafers were heated until the alcohol evaporated and a cladding plate was secured to each of the opposite sides of the filler plate. Four 1/32 inch diameter holes were drilled through one of the cladding plates to expose each of the compartments. The element was heated at 1000° C. for one hour in a furnace containing an inert atmosphere and was allowed to be furnace cooled. The element was then corrosion tested for three days in 750° F. steam at 2000 p.s.i. The results show that only the compartment containing the uncoated fuel wafer bulged and cracked while the graphite coated fuel wafers showed no signs of corrosion, cracking or bulging.

It is to be noted that in the foregoing examples only ceramic compositions of fuel material were used. However, the graphite barrier will also prevent interaction between the fuel and the cladding where a metallic fuel is utilized.

It is to be further noted that while only cladding material formed from a zirconium alloy was utilized, other similar metals such as titanium and alloys thereof and hafnium bearing alloys would produce similar results.

While the invention has ben described with respect to what is at present considered to be preferred embodiments thereof, it will be understood, of course, that certain changes, substitutions, modifications and the like may be made therein without departing from its true scope. Accordingly, it is intended that all matter contained in the foregoing description or shown in the accompanying drawings shall be interpreted as illustrative and not in a limiting sense.

We claim as our invention:

1. A corrosion resistant neutronic reactor fuel element comprising, a flat filler plate formed from a zirconium alloy consisting essentially of less than 2.5 weight percent of tin and less than 2 weight percent of a metal selected from the group consisting of iron, nickel, and cobalt, the balance being zirconium, and having a plurality of spaced compartments therein, fissile material formed from a material selected from the group consisting of uranium and uranium alloys located in each of said compartments, a pair of cladding plates formed from the same material as said filler plate secured thereto and cooperating therewith to hermetically seal said fissile material in said compartments, and a layer of graphite on the interfaces of said fissile material and said cladding plates, said layer being of sufficient thickness to prevent interdiffusion of said fissile material and said cladding plates at said interfaces.

2. A corrosion resistant neutronic reactor fuel element comprising, a flat filler plate formed from a zarconium alloy consisting essentially of less than 2.5 weight percent of tin and less than 2 weight percent of a metal selected from the group consisting of iron, nickel and cobalt, the balance being zirconium, and having a plurality of spaced compartments therein, fissile material in the form of a compact ceramic powder having uranium dioxide as a portion thereof located in each of said compartments, a pair of cladding plates formed from the same material as said filler plate secured thereto and cooperating therewith to hermetically seal said fissle material in said compartments, and a layer of graphite on the interfaces of said fissile material and said cladding plates, said layer being of sufficient thickness to prevent the interdiffusion of said fissile material and said cladding plates at said interfaces.

3. A fuel element comprising, a neutronic reactor central cladding plate formed from a zirconium alloy consisting essentially of less than 2.5 weight percent of tin and less than 2 weight percent of a metal selected from the group consisting of iron, nickel and cobalt, the balance being zirconium, and having at least one compartment therein, fissile material formed from a material selected from the group of uranium and uranium alloys located in said compartment, a pair of cladding covers formed from the same material as said central cladding plate secured to said central cladding plate and cooperating therewith to hermetically seal said fissile material, and a barrier material formed substantially from graphite located at the interfaces of said fissile material and said cladding plates.

4. A fuel element comprising, a neutronic reactor central cladding plate formed from a zirconium alloy consisting essentially of less than 2.5 weight percent of tin and less than 2 weight percent of a metal selected from the group consisting of iron, nickel and cobalt, the balance being zirconium, having a compartment therein, fissile material in ceramic form selected from the group consisting of uranium and uranium alloys located in said compartment, a pair of cover plates formed from the same material as said central cladding plate secured to said central cladding plate and cooperating therewith to hermetically seal said fissile material, and a barrier material formed substantially from graphite located at the interfaces of said fissile material and its enclosing plates, said barrier material being present in an amount at least equal to two milligrams per square inch.

5. A composite member comprising, a first member formed from a zirconium alloy consisting essentially of less than 2.5 weight percent of tin and less than 2 weight percent of a metal selected from the group consisting of iron, nickel and cobalt, the balance being zirconium, and a second member formed from a material selected from the group consisting of uranium and uranium alloys, a barrier material located at the interface of said first and second members formed substantially from graphite and present in an amount greater than two milligrams per square inch, whereby interdiffusion of said first and second members at said interface is prevented.

6. Means for preventing the interdiffusion at the interface of a first member formed from a material selected from the group consisting of uranium and uranium alloys and a second member formed from a zirconium alloy consisting essentially of less than 2.5 weight percent of tin and less than 2 weight percent of a metal selected from the group consisting of iron, nickel and cobalt, the balance being zirconium, comprising a barrier material located at said interface consisting substantially of graphite and present in an amount not less than two milligrams per square inch.

References Cited in the file of this patent

UNITED STATES PATENTS

| | | |
|---|---|---|
| 2,772,964 | Thomas et al. | Dec. 4, 1956 |
| 2,861,033 | Treshow | Nov. 18, 1958 |

OTHER REFERENCES

WAPD–MRP–66, PWR report for Dec. 24, 1956 to Feb. 23, 1957.

WAPD–MRP–67, PWR report for Feb. 24 to April 23, 1957.

WAPD–MRP–68, PWR report for April 24 to June 23, 1957, pp. 79–80.